March 19, 1929. H. O. THOMPSON 1,705,596

LUBRICATING MEANS FOR PITMAN BEARINGS

Filed Nov. 30, 1927

INVENTOR.
Henry Oliver Thompson
BY
Erwin, Wheeler & Woolard
ATTORNEYS.

Patented Mar. 19, 1929.

1,705,596

UNITED STATES PATENT OFFICE.

HENRY OLIVER THOMPSON, OF WAUPUN, WISCONSIN, ASSIGNOR TO EDWARD DONEY, OF WAUPUN, WISCONSIN.

LUBRICATING MEANS FOR PITMAN BEARINGS.

Application filed November 30, 1927. Serial No. 236,621.

This invention relates to improvements in lubricating means for pitman bearings with particular reference to wind mill heads.

It is the object of the invention to provide a novel, positive automatic means for lifting lubricant from the sump of a wind mill head for the lubrication of the upper pitman and lever bearings therein.

In the drawings.

Like parts are identified by the same reference characters throughout the several views.

Figure 1:
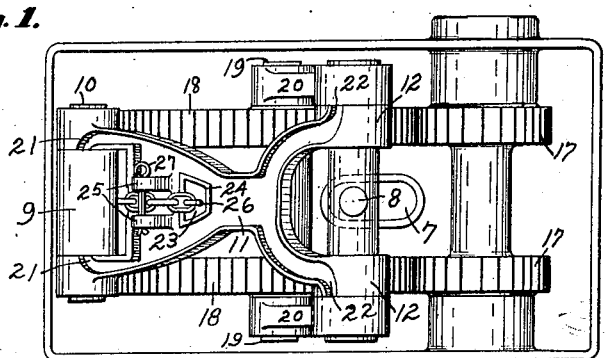
Figure 1 is a plan view of a wind mill head embodying this invention.

5 is the cast metal casing of the wind mill head formed to provide a sump to receive lubricant as indicated at 6 therein and having a tubular member leading upwardly through the sump as shown at 7 to provide an opening through which the pump head 8 may pass without loss of lubricant.

A standard at 9 carries a cross pin 10 upon which is fulcrumed a channeled guide lever 11 for the upper end of the pump rod. Lever 11 has apertured ears at 12 to receive the wrist pin 15 to which pitman 8 is connected.

Motion is transmitted to the pitman from the wheel shaft 16 by means of spaced pinions 17 on said shaft, gears 18 in mesh with the pinions, crank pins 19 on the outer faces of the gears and connecting rods 20 between crank pins 19 and the ends of wrist pin 15.

The sump contains a sufficient depth of oil to lubricate the pinions and gears and their respective bearings including the crank pins 19. It is impractical, however, to carry the depth of lubricant at any such level as would be adequate for the lubrication of the pintle 10 or the wrist pin 15. The present invention has particular reference to a means for lubricating these several bearings.

Figure 2:
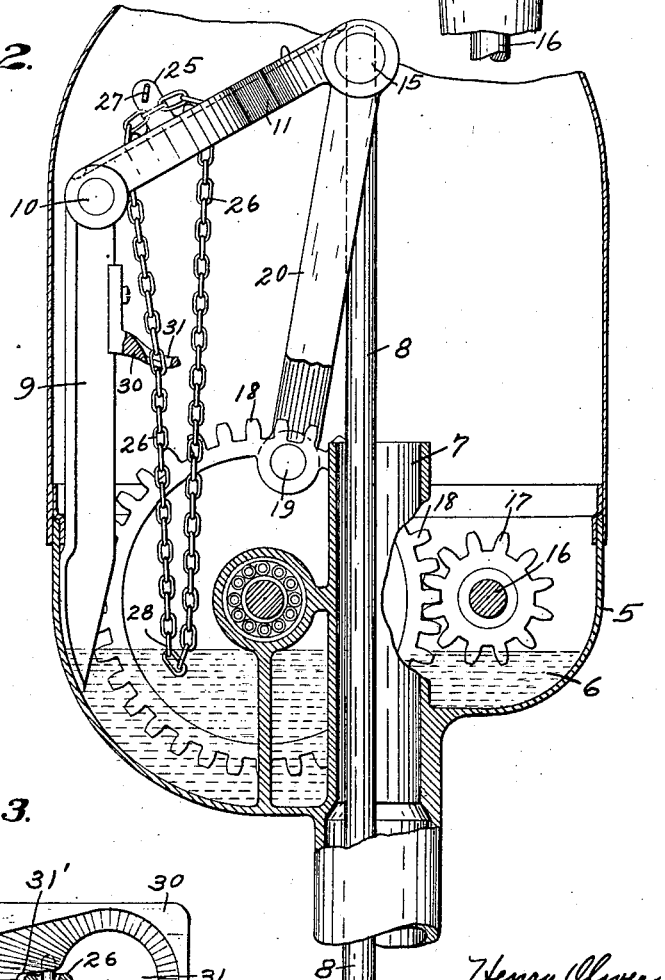
Figure 2 is a section thereof taken in central axial section.

Reference has already been made to the fact that lever 11 is in the form of a channeled member. Its structure in this regard is clearly shown in Figure 1 and the channel is also indicated by dotted lines in Figure 2. It will be obvious that any lubricant deposited in this channel will flow from one end to the other of lever 11 during its oscillation when the wind mill is in operation. The channel has branches leading at 21 to opposite sides of the supporting arm 9 whereby to lubricate the bearings at both ends of pintle 10 through branches at 22 leading to the opposite ends of wrist pin 15 to lubricate the bearing of lever 11 and connecting rods 20 upon the wrist pin.

The means by which lubricant is conducted to lever 11 to flow through these several branch channels to the desired points requiring lubrication will now be described.

Adjacent the point where the two channels 21 divide on the upper surface of lever 11 is an aperture 23 surrounded by a hollow marginal arm 24 which prevents lubricant from escaping therethrough. Adjacent the aperture are upstanding lugs 25 which provide a narrow guideway of just sufficient width to receive chain 26. A cotter pin or the like at 27 confines the chain between lugs 25.

The chain is endless, passing upwardly through the opening or wall at 23 and downwardly between the spaced ends or bearing portions of lever 11 which engage pintle 10. Its lower extremity 28 hangs beneath the surface of lubricant in the sump at 6, the chain being of such length that this is true even in the uppermost position of the pump rod as shown in the drawings.

Figure 3:
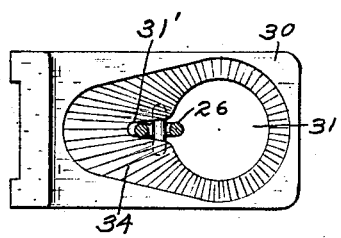
Figure 3 is an enlarged detail of a fixed port which intermittently seizes and releases the oil chain for the actuation thereof.

At an intermediate point on arm 9 is the fitting which is shown in detail and in plan in Figure 3. It comprises a finger 30 having an aperture therein in the form of a keyhole slot at 31. The round portion of this aperture is of sufficient diameter to freely receive and permit the passage of the chain. The narrow portion 31' of the slot is so constructed as to be adapted to receive any link of the chain which is parallel thereto and to engage the succeeding transverse link as is clearly shown in Figure 3. It will be noted from Figure 2, however, that opening 31 is tapered to provide an inclined wall at 34 adapted to guide any transverse link thereabove toward the circular portion 31 of the opening.

The arrangement is such that during each upward oscillation of lever 11, the entire chain 26 tends to move therewith. The finger 30, however, is so formed that during the upward oscillation, the transverse link of the chain will become caught in the narrow portion 31 of the keyhole slot with the result that this portion of the chain will be held stationary. The continued upward movement of lever 11 will increase the distance between guide lugs 25 and finger 30, thus causing a certain length of chain 26 to pass between the guide lugs in a counter-clockwise direction as viewed in these drawings. Thereby some of the chain will be lifted from the sump and the oil carried by this portion of the chain will ultimately, during successive portions of the operation, be deposited upon the guide lugs and through portions of lever 11 to flow through the channels of such lever to the bearings requiring lubrication.

At each downward movement of the lever, the entire chain will be lowered. The finger 30 will not engage the chain in this direction due to the fact that the chain slips off of the inclined surface 34 into the larger diameter portion 31 of the keyhole slot and is thereby enabled to pass freely through the finger. This bodily downward movement of the chain brings a fresh section thereof into registry with the finger so that when the lever 11 is again oscillated upwardly, a new length of chain will be advanced across the top of lever 11 to deposit lubricant thereon.

It will be obvious that the arrangement described will carry a considerable quantity of lubricant to lever 11 for distribution into the channels thereof, since considerable lengths of the chain will ordinarily be caused to pass across said lever during each lever operation.

I wish it understood that while a chain is particularly adapted to perform the desired functions of catching in the detent finger 30 and providing adequate surface for elevating lubricant, any other flexible carrier may be used equivalently and reference to a chain in the appended claims is to be regarded as generic.

I claim:

1. The combination with a sump for lubricant and a part movable thereto and therefrom, of an endless conveyor depending from said part into said sump and a relatively stationary detent finger engageable with a portion of said conveyor in one direction of bodily movement thereof with said part, said detent being adapted to restrain a portion of said conveyor engaged thereby whereby to produce relative movement of said conveyor upon said part and to deposit on said part lubricant carried by said conveyor.

2. In a device of the character described, the combination with a sump for lubricant and a part movable toward and from said sump and provided with a chain guiding portion and an oil delivering channel therefrom, of a free hanging endless chain guided upon said portion and depending from said part in a position to enter lubricant in said sump during the movement of said part and means for drawing said chain across the guiding portion of said part whereby to deposit in said channel lubricant picked up by said chain in said sump.

3. In a device of the character described, the combination with a sump for lubricant and a part movable toward and from said sump and provided with a bearing and chain guide, of a chain depending from said chain guide into said sump and adapted to pick up lubricant by adhesion and means for advancing said chain across said guide to deposit thereon lubricant for said bearing, said means comprising a relatively fixed finger formed to engage a portion of said chain in only one direction of the movement of said chain relative thereto.

4. The combination with a sump for lubricant, of a lever provided with bearings at its ends and a channel leading to said bearings, of a chain guide on said lever, an endless chain engaged with said guide and depending from said lever to partake of the oscillation thereof, said chain being of a length to pick up lubricant by adhesion from said sump and a relatively fixed detent finger formed to engage a portion of said chain in only one direction of its movement with said lever to cause said chain to traverse said guide and to deposit lubricant thereon.

5. The combination with a sump for lubricant, of a lever provided with bearings at its ends and a channel leading to said bearings, of a chain guide on said lever, an endless chain engaged with said guide and depending from said lever to partake of the oscillation thereof, said chain being of a length to pick up lubricant by adhesion from said sump and a relatively fixed detent finger formed to engage a portion of said chain in only one direction of its movement with said lever to cause said chain to traverse said guide and to deposit lubricant thereon, said finger including a downwardly inclined portion provided with a narrow slot whereby said chain will slip from said portion in its downward movement and engage in said slot when said lever moves upwardly.

6. The combination with a sump for lubricant and an arm extending thereabove, of a lever fulcrumed to said arm and provided with a bearing adjacent said arm and a bearing remote therefrom, said lever having channels leading to said bearings and a central aperture provided with a marginal ridge separating it from said channels, a chain guide adjacent said aperture, an endless chain passing through said aperture and inserted in said guide, whereby to be adapted to be stripped of lubricant for said channels and a detent for one side of said chain, comprising a finger provided with a narrowing slot in an inclined portion, whereby to engage said chain in but one direction of oscillation of said lever, said chain being of a length to hang in said sump.

7. The combination with a reciprocatory member to be lubricated, of a sump for lubricant at one end of the field of reciprocation, a flexible endless carrier supported by the reciprocating member in a position to dip into the lubricant at one end of its reciprocating stroke and a relatively stationary guide for the carrier adapted to engage and hold it on one side during the stroke in one direction to impart step by step movements to the carrier along its support on the reciprocating member whereby lubricant may be conveyed thereto.

8. A lubricant carrier for a reciprocatory member, in combination with a relatively stationary guide having an aperture through which the carrier may freely move and also having a notch in one wall of the aperture in which the carrier may be engaged during one portion of the stroke of the reciprocatory member to cause a relative movement of the carrier for distribution of lubricant to the reciprocatory member.

HENRY OLIVER THOMPSON.